(12) United States Patent
Beraud et al.

(10) Patent No.: US 10,576,697 B2
(45) Date of Patent: Mar. 3, 2020

(54) METHOD OF APPLYING AN INTERMEDIATE MATERIAL MAKING IT POSSIBLE TO ENSURE THE COHESION THEREOF, METHOD OF FORMING A STACK INTENDED FOR THE MANUFACTURE OF COMPOSITE COMPONENTS AND INTERMEDIATE MATERIAL

(71) Applicant: Hexcel Reinforcements, Dagneux (FR)

(72) Inventors: Jean-Marc Beraud, Rives (FR); Jacques Ducarre, Corbelin (FR)

(73) Assignee: HEXCEL REINFORCEMENTS, Dagneux (FR)

( * ) Notice: Subject to any disclaimer, the term of this patent is extended or adjusted under 35 U.S.C. 154(b) by 115 days.

(21) Appl. No.: 15/911,258

(22) Filed: Mar. 5, 2018

(65) Prior Publication Data
US 2018/0186104 A1    Jul. 5, 2018

Related U.S. Application Data

(62) Division of application No. 14/441,192, filed as application No. PCT/FR2013/052760 on Nov. 18, 2013, now abandoned.

(30) Foreign Application Priority Data

Nov. 19, 2012   (FR) ..................................... 12 60966

(51) Int. Cl.
*B29C 70/38*     (2006.01)
*B29C 70/54*     (2006.01)
(Continued)

(52) U.S. Cl.
CPC .......... *B29C 70/382* (2013.01); *B29C 70/086* (2013.01); *B29C 70/38* (2013.01);
(Continued)

(58) Field of Classification Search
CPC .. B32B 5/26; B32B 3/30; B32B 5/022; B29C 70/56; B29C 70/543
See application file for complete search history.

(56) References Cited

U.S. PATENT DOCUMENTS 5,258,585 A * 11/1993 Juriga ................... B29C 43/203
                                                181/286
6,503,856 B1    1/2003 Broadway et al.
(Continued)

FOREIGN PATENT DOCUMENTS

EP          1125728        10/2011
JP       2005-219228 A      6/2005
(Continued)

OTHER PUBLICATIONS

JP2005-219228A English Translation.
2006-142819A English Translation.

*Primary Examiner* — Christopher T Schatz
(74) *Attorney, Agent, or Firm* — W. Mark Bielawski; David J. Oldenkamp (57) ABSTRACT

The present invention relates to a method for applying spot transverse forces to an intermediate material composed of a layer of unidirectional reinforcing fibers associated on at least one of its faces to a layer of thermoplastic and/or thermosetting material that does not represent more than 10% of the total weight of the intermediate material, wherein the spot transverse forces are applied while the intermediate material is under tension in the direction of the unidirectional reinforcing fibers.

13 Claims, 8 Drawing Sheets

(51) Int. Cl.
  *B29C 70/56* (2006.01)
  *B32B 7/08* (2019.01)
  *B29C 70/08* (2006.01)
  *B32B 3/26* (2006.01)
  *B32B 3/30* (2006.01)
  *B32B 5/02* (2006.01)
  *B32B 5/26* (2006.01)
  *B29C 70/44* (2006.01)
  *B29C 70/20* (2006.01)
  *B29K 105/08* (2006.01)
  *B29K 307/04* (2006.01)

(52) U.S. Cl.
  CPC .......... *B29C 70/386* (2013.01); *B29C 70/543* (2013.01); *B29C 70/545* (2013.01); *B29C 70/56* (2013.01); *B32B 3/266* (2013.01); *B32B 3/30* (2013.01); *B32B 5/022* (2013.01); *B32B 5/26* (2013.01); *B32B 7/08* (2013.01); *B29C 70/20* (2013.01); *B29C 70/443* (2013.01); *B29K 2105/0881* (2013.01); *B29K 2307/04* (2013.01); *B32B 2260/023* (2013.01); *B32B 2260/046* (2013.01); *B32B 2262/02* (2013.01); *B32B 2262/106* (2013.01); *B32B 2305/08* (2013.01); *B32B 2307/516* (2013.01); *B32B 2307/54* (2013.01); *B32B 2307/718* (2013.01)

(56) References Cited

U.S. PATENT DOCUMENTS

| | | | |
|---|---|---|---|
| 6,703,331 | B1 | 3/2004 | Bruce et al. |
| 6,828,016 | B2 | 12/2004 | Mitani et al. |
| 8,236,410 | B2 | 8/2012 | Shinoda et al. |
| 2003/0148082 | A1* | 8/2003 | Bompard ............. B29C 70/202 428/292.1 |
| 2004/0209041 | A1* | 10/2004 | Muth .................... A61F 13/512 428/131 |
| 2012/0015167 | A1 | 1/2012 | Beraud et al. |

FOREIGN PATENT DOCUMENTS

| | | |
|---|---|---|
| JP | 2006-142819 A | 6/2006 |
| WO | 97/00345 | 1/1997 |
| WO | 00/58083 | 10/2000 |
| WO | 2006/121961 | 11/2006 |
| WO | 2007/010049 | 1/2007 |
| WO | 2007/05706 | 2/2007 |
| WO | 2009/156157 A1 | 12/2009 |
| WO | 2010/046609 | 4/2010 |
| WO | 2010/061114 | 6/2010 |
| WO | 2011/086266 | 7/2011 |

* cited by examiner

METHOD OF APPLYING AN INTERMEDIATE MATERIAL MAKING IT POSSIBLE TO ENSURE THE COHESION THEREOF, METHOD OF FORMING A STACK INTENDED FOR THE MANUFACTURE OF COMPOSITE COMPONENTS AND INTERMEDIATE MATERIAL

This application is a divisional of U.S. Ser. No. 14/441, 192, which was filed on May 7, 2015, and which is a 371 of PCT/FR2013/052760, which was filed on Nov. 18, 2013.

BACKGROUND OF THE INVENTION

1. Field of the Invention

The present invention relates to the technical field of reinforcing materials, suitable for the forming of composite parts. More precisely, it relates to methods and uses for improving the resistance to delamination of materials during their application.

2. Description of Related Art

The fabrication of composite parts or articles, i.e. comprising, firstly, one or more reinforcements or fibrous sheets and, secondly, a matrix (which is, usually, mainly of thermosetting type and can include one or more thermoplastics) can, for example, be produced by a method called "direct" or "LCM" (Liquid Composite Molding) method. A direct method is defined by the fact that one or more fibrous reinforcements are employed in the "dry" state (i.e. without the final matrix), the resin or matrix, being implemented separately, for example by injection into the mold containing the fibrous reinforcements (the "RTM" method, for Resin Transfer Molding), by infusion through the thickness of the fibrous reinforcements ("LRI" method or Liquid Resin Infusion method, or "RFI" method or Resin Fihn Infusion method), or else by manual coating/impregnation with roller or brush, on each of the individual layers of fibrous reinforcement, applied successively to the form.

For the RTM, LRI or RFI methods, it is generally necessary to first of all manufacture a fibrous preform or stack of the shape of the desired finished article, then impregnate this preform or stack with a resin intended to form the matrix. The resin is injected or infused by differential pressure at a given temperature, then once the entire required quantity of resin is contained in the preform, the whole is taken to a higher temperature to perform the cycle of polymerization/reticulation and thus lead to its hardening.

Composite parts used in the automotive, aeronautical or naval industries are particularly subject to very strict requirements, particularly in terms of mechanical properties. To save fuel, the aeronautical industry has replaced many metallic materials by composite materials, which are lighter.

The resin which is subsequently added, particularly by injection or infusion, to the unidirectional reinforcing sheets during the production of the part can be a thermosetting resin, for example of epoxy type. To allow proper flow through a preform composed of a stack of different layers of carbon fibers, this resin is usually very fluid, for example with a viscosity in the order of 50 to 200 mPa·s. at the infusion/injection temperature. The major drawback of this type of resin is its fragility after polymerization/reticulation, which causes the produced composite parts to have poor impact resistance.

In order to solve this problem, it has been proposed in documents of the prior art to combine the unidirectional layers of carbon fibers with intermediate polymer layers, and in particular with a non-woven material made of thermoplastic fibers. Such solutions are notably described in the patent applications or patents EP 1125728, U.S. Pat. No. 6,828,016, WO 00/58083, WO 2007/015706, WO 2006/121961 and U.S. Pat. No. 6,503,856. The addition of this intermediate layer of polymer, such as a non-woven material, makes it possible to improve the mechanical properties in the Compression After Impact (CAI) test, a test commonly used to characterize the impact resistance of structures.

The applicant has also proposed, in the earlier patent applications WO 2010/046609 and WO 2010/061114, particular intermediate materials consisting of a sheet of unidirectional fibers, in particular made of carbon, coupled by adhesion of each of its faces with non-woven thermoplastic fiber material (also known as non-woven material), as well as the method for manufacturing these materials.

When employing such intermediate materials, particularly in the form of veiled tapes, the Applicant has observed that upon the automated lay-up of a veiled tape, the latter is bonded to the preceding ply by a combination of a pressure and heating action followed by cooling, the latter being possibly achievable without any particular calorie-extracting action, by using a "natural" process. The tape is then bonded to the preceding ply by its lower face, and this mechanical bond is shear stressed all the time the tape is being laid-up. The stress is of an intensity proportional to the (lay-up tension)/(bonded length). The laying-up tension being generally considered to be constant, and the result is that the shear stress is higher in the first centimeters of lay-up and will decrease with the length of the laid-up tape. The shear stress is distributed over the whole thickness of the tape and, if the laying-up tension is too high, a delamination of the tape in its central area, which is composed of dry reinforcing fibers, has been observed in some cases by the applicant in the first centimeters of lay-up. Indeed, the applicant has observed that in such materials comprising a tape of unidirectional fibers associated on at least one of its faces to a layer of thermoplastic and/or thermosetting material, a preferential mechanical bond is established between the filaments located on their main faces on the tape and the thermoplastic and/or thermosetting material, whereas the central area of the tape, which solely composed of filaments, is the area with a lower shear strength.

This phenomenon can also be accentuated in the case of materials associated on each of their main faces to a layer of thermoplastic and/or thermosetting material, when a laying-up member, of the small or large roller type depending on the width of the material to be laid up, is used to lay up the material. In this case, in the very first millimeters, or even centimeters, of bonding of the material, the face in contact with the roller tends to adhere to it, which can also promote the delamination of the material when its other face is then bonded to the surface on which it is laid and which can be a support or the preceding ply.

SUMMARY OF THE INVENTION

In this context, the objective of the invention is to remedy the delamination problems that can be observed in some cases, during the application of intermediate materials composed of a layer of reinforcing fibers associated on at least one its faces to a layer of thermoplastic or thermosetting material or a mixture of thermoplastic and thermosetting materials, such as for example with the veiled tapes described in the patent applications WO 2010/046609 and WO 2010/061114, which are implemented in the production of stacks in particular. To do this, the present invention proposes a new deposition method implementing a prior step and making it possible to preserve the integrity of the intermediate materials used during deposition (laying-up).

The present invention relates to a method for continuously applying on a deposition surface of an intermediate material composed of a unidirectional layer of reinforcing fibers associated on at least one of its faces to a layer of thermoplastic and/or thermosetting material, the layer(s) of thermoplastic and/or thermosetting material forming the intermediate material not representing more than 10% of the total weight of the intermediate material, and preferably representing 0.5 to 10%, and more preferably 2 to 6%, of the total weight of the intermediate material, wherein:
  prior to its application, the intermediate material has undergone an operation applying spot transverse forces, performed in such a way as to traverse the total thickness of the intermediate material and accompanied by heating, leading to the at least partial melting of the thermoplastic material or the partial or complete polymerization of the thermosetting material, at the spot application of transverse force, and leading to the penetration of the thermoplastic and/or thermosetting material and creating bonding bridges in the thickness of the unidirectional layer of reinforcing fibers, preferably extending from one main face to the other of the unidirectional layer of reinforcing fibers,
  the intermediate material is continuously applied, along a given movement trajectory, with simultaneous application on the intermediate material of a tension and a pressure, in such a way as to apply it on the deposition surface, the deposition being performed by applying one face of the intermediate material in the process of being laid up to a layer of thermoplastic and/or thermosetting material on the deposition surface and/or by applying the intermediate material in the process of being laid up on the deposition surface carrying a thermoplastic and/or thermosetting material, and by activating the thermoplastic and/or thermosetting material that will exist at the interface between the intermediate material and the deposition surface, in such a way as to ensure the bond between the laid-up intermediate material and the deposition surface.

In the context of the invention, before the deposition operation the intermediate material undergoes an operation applying spot transverse forces, in such a way as to increase cohesion in the thickness of the intermediate material. The integrity of the intermediate material is then better preserved during its deposition, in spite of the shear stresses it undergoes.

The invention also relates to a method for forming a stack by successive applications of intermediate materials composed of a unidirectional layer of reinforcing fibers associated on at least one its faces to a layer of thermoplastic and/or thermosetting material, wherein the intermediate materials are applied according to the continuous method of the invention. The produced stack includes several unidirectional layers of reinforcing fibers, with at least two unidirectional layers of reinforcing fibers extending in different directions.

Another subject of the invention is the use, in a continuous application method according to the invention, of an intermediate material having previously undergone an operation applying spot transverse forces, to preserve the cohesion of the material during its deposition, and in particular in the first centimeters of deposition.

Another subject of the invention is a method for fabricating a composite part comprising a step of formation, according to the method defined in the context of the invention, of a stack by successive applications of intermediate materials, said intermediate materials being each composed of a layer of reinforcing fibers associated on at least one of its faces to a layer of thermoplastic or thermosetting material, followed by a step of diffusion, by infusion or injection, of a thermosetting resin, of a thermoplastic resin or of a mixture of such resins, inside the stack, followed by a step of consolidation of the desired part followed by a step of polymerization/reticulation according to a defined pressure-temperature cycle, and a cooling step.

The present invention also relates to intermediate materials composed of a unidirectional layer of reinforcing fibers associated on at least one of its faces to a thermoplastic and/or thermosetting material, the layer(s) of thermoplastic and/or thermosetting material forming the intermediate material not representing more than 10% of the total mass of the intermediate material and preferably representing from 0.5 to 10%, and more preferably from 2 to 6%, of the total mass of the intermediate material having undergone an operation applying spot transverse forces, performed in such a way as to traverse the total thickness of the intermediate material and being accompanied by heating leading to the at least partial melting of the thermoplastic material or the partial or complete polymerization of the thermosetting material, at the application spots of transverse forces, and leading to the penetration of the thermoplastic and/or thermosetting material and creating bridges in the thickness of the unidirectional layer of reinforcing fibers, preferably extending from one main face of the unidirectional layer of reinforcing fibers to the other. Advantageously, the operation applying spot transverse forces is carried out with a density of application points of 40000 to 250000 per m$^2$, and preferably of 90000 to 110000 per m$^2$ and the obtained intermediate material has an opening factor of 0 to 2%, and preferably of 0 to 1% and more preferably of 0%. In particular, such an intermediate material can have an opening factor of 0 to 2% and preferably of 0%, and have been obtained with a density of application points of 90000 to 110000 per m$^2$.

The following description, with reference to the appended figures, makes it possible to better understand the invention and details various variant of implementations, indiscriminately applicable to the methods and uses forming the subject of the invention.

The invention uses the continuous application of an intermediate material, along a given movement trajectory, with simultaneous application on the intermediate material of a tension and a pressure in such a way as to apply it on the deposition surface, the laying-up being carried out by applying one face of the intermediate material in the process of being laid up corresponding to a layer of thermoplastic and/or thermosetting material on the deposition surface and/or by applying the intermediate material in the process of being laid up on the deposition surface carrying a thermoplastic and/or thermosetting material, and by activating, at the deposition area, the interface between the intermediate material and the deposition surface, in such a way as to ensure the bond between the laid-up intermediate material and the deposition surface.

DETAILED DESCRIPTION OF THE INVENTION

Figure 1A:
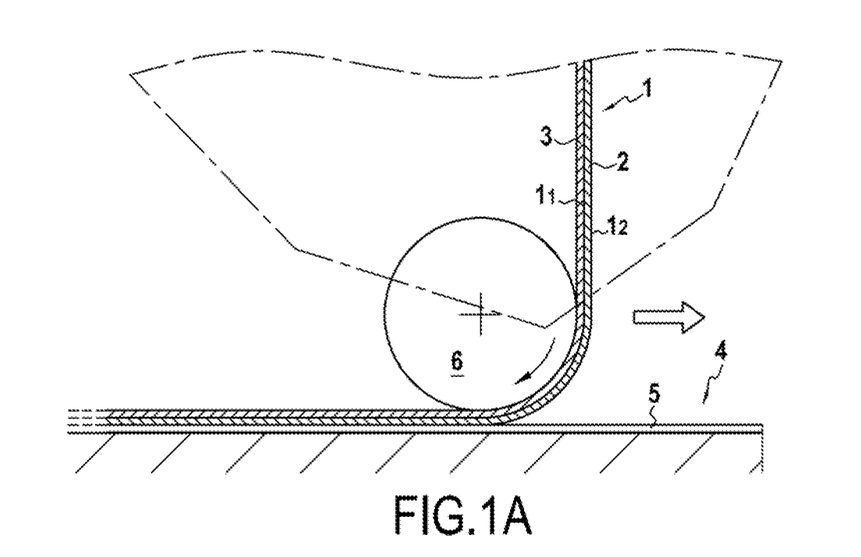
FIGS. 1A and 1B are schematic views illustrating two modes of application of intermediate materials that can be used in the context of the invention.

FIG. 1A illustrates the application of an intermediate material 1 composed of a layer of unidirectional fibers 2 associated to a single one of its faces named 1₁ to a layer of thermoplastic and/or thermosetting material 3. The intermediate material is applied so that its face 1₂, which corresponds to the layer of unidirectional fibers 2, is applied against the deposition surface 4. In this case, the deposition surface 4 is itself composed of a layer of thermoplastic and/or thermosetting material 5 which is activated and which ensures the bond with the intermediate material. The activation is ensured by appropriate means that are not represented, as the intermediate material is laid up.

Figure 1B:
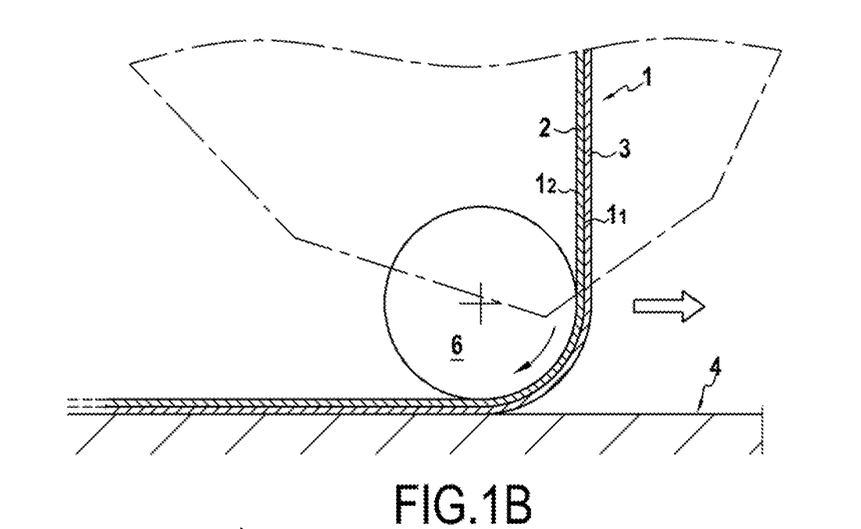

Usually, the intermediate material is continuously applied, along a given movement trajectory, with simultaneous application on the intermediate material of a tension and a pressure in such a way as to apply on the deposition surface a face of the intermediate material in the process of being laid up corresponding to a layer of thermoplastic and/or thermosetting material and by activating said layer of thermoplastic and/or thermosetting material during deposition, in such a way as to ensure the bond between the laid-up intermediate material and the deposition surface. One such possibility where the intermediate material is applied in such a way as to apply the layer of thermoplastic and/or thermosetting material 3 against the deposition surface 4 is shown in FIG. 1B.

Whatever the scenario, the activation is done at or near the deposition area, in such a way as to render sticky the layer of thermoplastic and/or thermosetting material ensuring the bonding, before the contact between the intermediate material and the deposition surface is achieved.

Conventionally, in the context of the invention, the formation of composite parts involves the production of a stack or preform of intermediate materials. Each intermediate material comprises a layer of reinforcing fibers associated on at least one of its faces to a layer of thermoplastic or thermosetting material or of a mixture of thermoplastic or thermosetting materials. In order to form the desired stack, each intermediate material is applied on a surface which can be, either a support element in the case of the application of the first layer of intermediate material(s) required to produce the stack, or a previously applied intermediate material. The application of each intermediate material is preferably performed in such a way that at least one layer of thermoplastic or thermosetting material or a mixture of thermoplastic and thermosetting materials is applied on the deposition surface and is activated during its deposition, in such a way as to ensure the bond with the surface on which the intermediate material is applied. Such a deposition facilitates the application of the first ply, which can be applied on any type of gluing surface compatible with the chosen polymer material. In addition, at least one layer of thermoplastic or thermosetting material or a mixture of thermoplastic and thermosetting materials thus exists at the interface of two intermediate materials applied one on top of the other and ensures their mutual bond.

Figure 2:
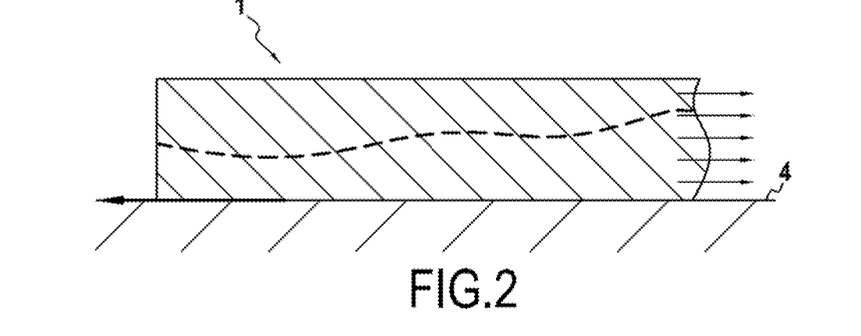
FIG. 2 schematically represents the forces applied to an intermediate material at the start of its deposition.

In the context of the invention, the application of an intermediate material is performed continuously, with application of a pressure on the latter in such a way as to apply it on the deposition surface. The force resulting from this pressure can, for example, be of 0.3 to 8N per cm of width of the intermediate material. To ensure an adequate application, the intermediate material is stretched during its deposition. To do this, it is stretched parallel to the direction of the unidirectional fibers. In particular, a tension of 2 to 50 g per cm of width of the intermediate material can, in particular, be applied to the intermediate material. The result is that in the first centimeters of deposition, the intermediate material 1 undergoes a shear stress due to the fact that it is stretched in one direction due to its bonding to the deposition surface 4 and in the opposite direction due to the tension applied to the latter, as schematically represented in FIG. 2.

Advantageously, the laying-up member is a rotating device of large roller, roller or small roller type, according to the width of the intermediate material applied. This laying-up member is coupled to a device for moving and feeding the material during its deposition. The deposition of the intermediate material can thus be performed in an automated manner using a control device.

Figure 3:
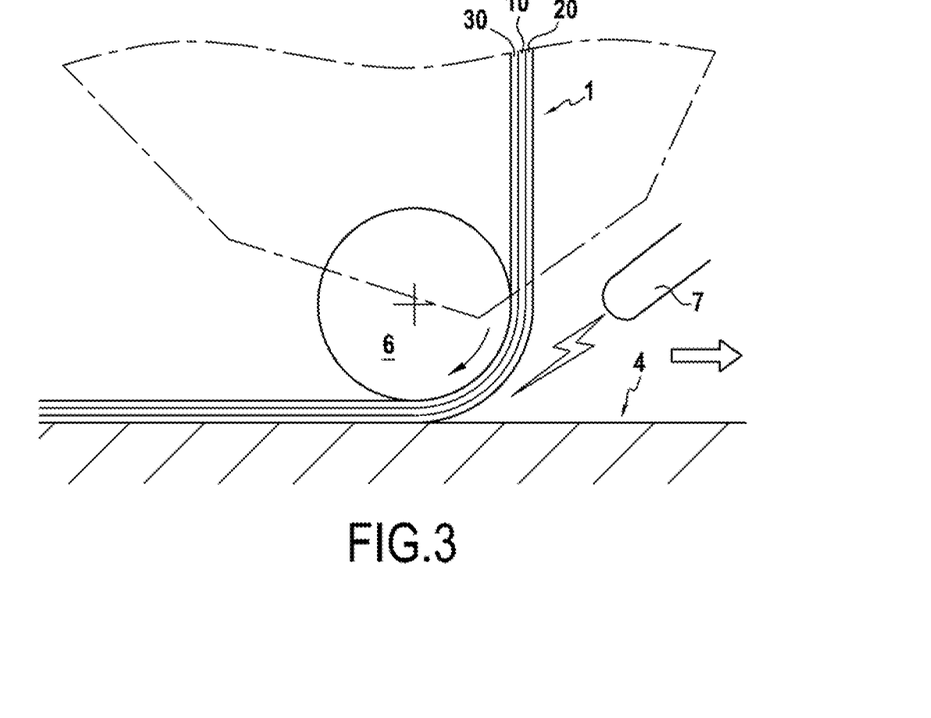
FIG. 3 is a schematic view illustrating another mode of application of intermediate materials that can be used in the context of the invention.

FIG. 3 illustrates another embodiment wherein the movement of the intermediate material 1 is ensured as it is laid up by exerting a pressure, preferably substantially perpendicular to the deposition surface 4 to which it is applied. The laying-up member is composed of a roller 6 which exerts a pressure on the material 1, in such a way as to apply it to the deposition surface 4. In the example illustrated in FIG. 3, the intermediate material is composed of a unidirectional sheet 10 associated on each of its faces to a layer of thermoplastic and/or thermosetting material 20 and 30. The handling of such symmetrical intermediate materials is easier, given that in all cases two layers of thermoplastic and/or thermosetting material exist at the interface, and the material can be applied to either one of its faces. The layer of thermoplastic and/or thermosetting material located at the interface of the intermediate material in the process of being laid up and the surface on which it is applied is activated as the deposition is carried out, by any appropriate means, for example by a heating device, particularly an infrared light, a hot gas duct or a laser represented by the reference number 7 in FIG. 3, oriented toward the deposition area of the intermediate material. It has in particular been demonstrated that the use of a laser diode of 500 W and of a wavelength between 965 nm and 980 nm offered the possibility of laying up the intermediate material at speeds of 1 m/second over 50 mm in width. A higher power makes it possible to further increase this speed or to lay up a greater width. The activation makes it possible to soften the polymer layer to be activated by effecting an at least partial melting in the case of a thermoplastic material and the start of polymerization in the case of a thermosetting material.

After cooling, which can occur naturally, without additional extraction of heat, the bonding of the material to the deposition surface is thus ensured. The depositing trajectory of the intermediate material can be straight or curved. The unidirectional fibers follow the depositing trajectory.

Figure 4A:
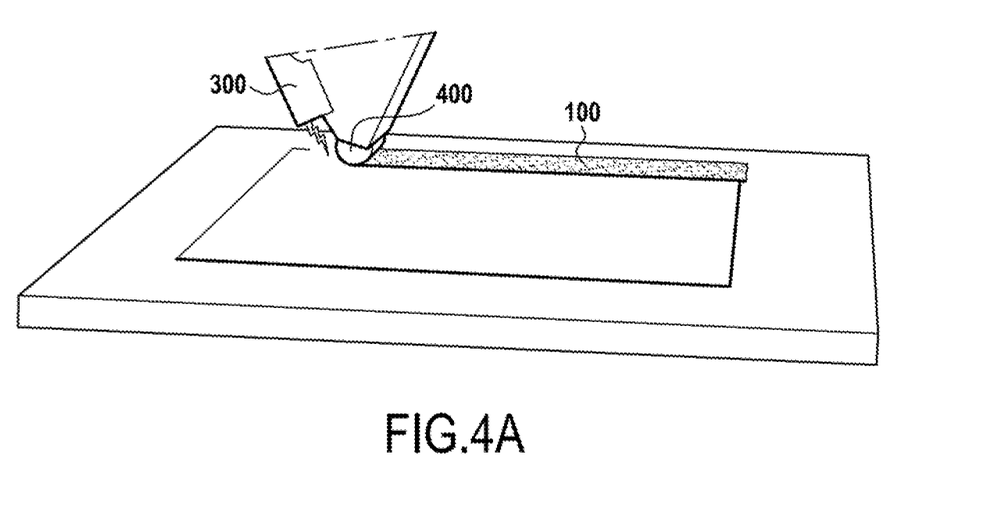
FIGS. 4A to 4C are schematic views illustrating the successive application of intermediate materials appearing in tape form.
Figure 4B:
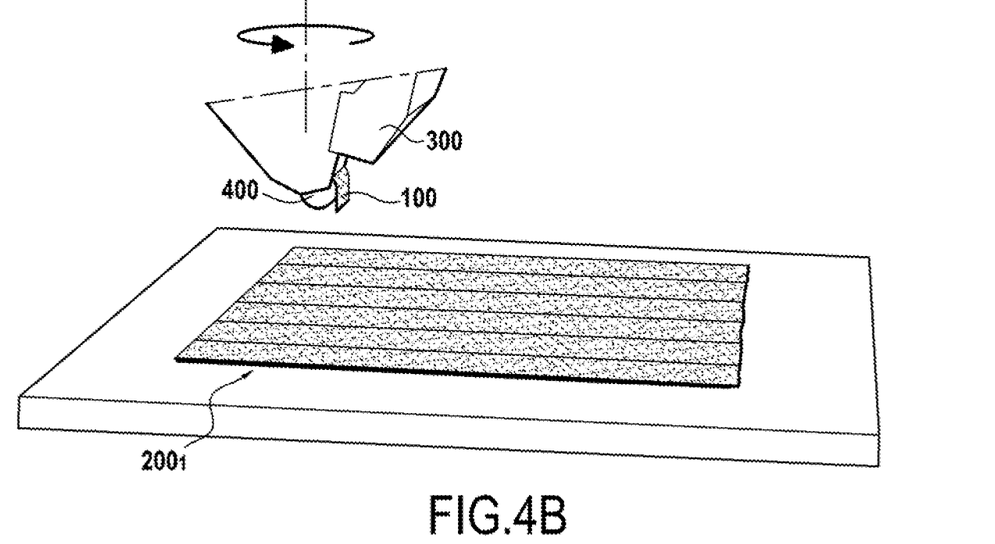
Figure 4C:
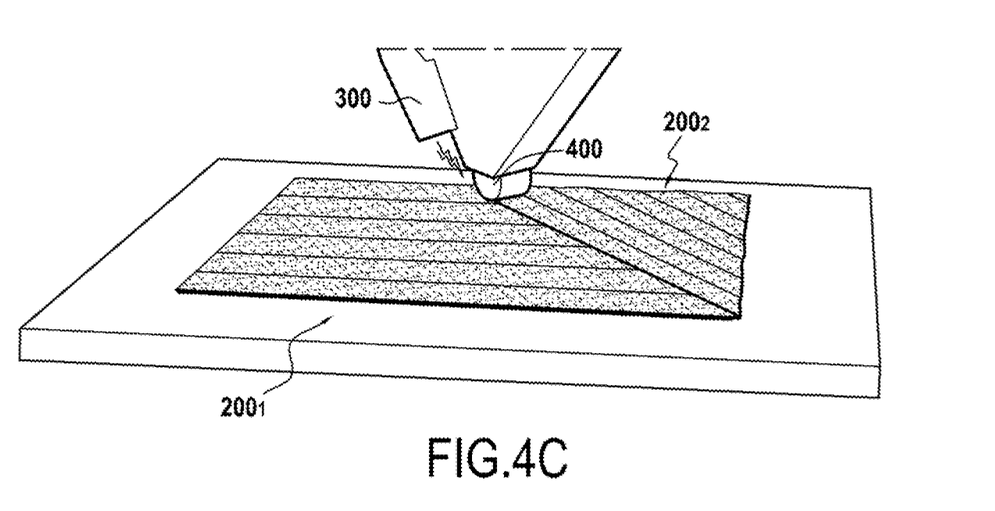

FIGS. 4A to 4C illustrate an embodiment wherein different strips 100 of intermediate materials are laid up one in front of the other along parallel deposition trajectories, in such a way as to form layers $200_1$ to $200_n$. As illustrated in FIG. 4A, the device 300 for activating the thermoplastic and/or thermosetting material forms a single component with the laying-up member 400 so that they can move together. The laying-up member 400 is moved for the depositing of the various strips 100 which are cut at the end of the trajectory using a cutting member (not represented). When a layer is entirely applied, the orientation of the laying-up member is modified, as illustrated in FIG. 4B, in the case of the first layer $200_1$, in such a way as to lay up the different strips of successive intermediate materials that must form the following layer along a different deposition trajectory from the preceding layer. FIG. 4C represents the depositing of the second layer $200_2$. The strips 100 of intermediate materials forming one and the same layer are laid up adjacently, without inter-strip spacing, and with a gluing over 100% of their surface area. It is thus possible to produce a said multi-axial material. The depositing method illustrated in FIGS. 4A to 4C is particularly suitable for the application of intermediate materials of a width between 3 and 300 mm and with small width variation, typically having a standard deviation on the width of less than 0.25 mm.

In the context of the invention, the intermediate material is prepared, prior to its continuous application during which the latter undergoes a certain pressure and a certain tension giving rise to the application of shear stresses, in such a way as to guarantee a better cohesion of the intermediate material in spite of the shear forces exerted on the latter during the lay-up operation. This preparation consists in performing on the intermediate material an operation applying spot transverse forces, in such a way as to traverse the total thickness of the intermediate material. This pointwise application of spot transverse forces is accompanied by heating, leading to the at least partial melting of the thermoplastic material or the partial or complete polymerization of the thermosetting material, at the application spots of transverse forces, and creates bonding bridges in the thickness of the unidirectional layer of reinforcing fibers. Preferably, these bonding bridges are established between the two main faces of the unidirectional layer of reinforcing fibers.

The invention is adapted to the application of intermediate materials wherein, over at least a part of the thickness of the unidirectional layer, the unidirectional reinforcing fibers are dry, i.e. not impregnated with thermoplastic and/or thermosetting material, and therefore more sensitive to delamination. The thermoplastic and/or thermosetting layer(s) associated with the unidirectional sheet can however have slightly penetrated into the latter upon attachment, generally carried out by thermocompression, but the central part, in the case of a material including two layers of thermoplastic and/or thermosetting material, or the part opposite the layer of thermoplastic and/or thermosetting material in the case of a material including only one layer of thermoplastic and/or thermosetting material, which generally corresponds to at least 50% of the thickness of the layer of unidirectional fibers, remains unimpregnated and is therefore classed as dry. The penetration operation consists in traversing the total thickness of the intermediate material, while heating the thermoplastic or thermosetting material in such a way that the latter is softened and can be drawn into the layer of unidirectional fibers, at the application spots of transverse forces. Once cooled, the thermoplastic and/or thermosetting material creates bonding bridges in the thickness of the layer of unidirectional fibers, which reinforces its cohesion. After such an operation, with the exception of the areas bordering the application spots of transverse forces, over at least 50% of its thickness, the layer of unidirectional fibers is dry, i.e. unimpregnated with thermoplastic and/or thermosetting material.

In the context of the invention, the operation applying spot transverse forces corresponds to an operation of penetration at different application or penetration points. In the remainder of the description, the terms "operation of spot application of transverse forces" or "operation of penetration at different penetration points" will be used indiscriminately to describe such a step consisting in traversing an intermediate material, at least over a part of its thickness. The operation of applying spot transverse forces is preferably performed using the penetration of a needle or a series of needles, which makes it possible to properly control the orientation of the transverse forces. The operation of applying spot transverse forces performed on the intermediate material must be accompanied by heating, leading to the at least partial melting of the thermoplastic material and/or the softening of the thermosetting material at the application spots of transverse forces. To do this, for example, a penetrating member, itself heated, will be used. However, such an operation could easily be performed using a hot gas jet. Although this is not preferred, heating the layer of thermoplastic and/or thermosetting material prior to the penetration operation could also be envisioned.

Advantageously, the operation applying spot transverse forces is performed by applying a tensile force to the intermediate material. First of all, a sufficient tension, particularly of 15 to 3000 g per cm of width will be applied to the intermediate material, usually as it is fed through, during the penetration operation, in such a way as to allow the introduction of the chosen penetrating means or member. Advantageously, the tensile force on the intermediate material will be selected in such a way as to lead to the at least partial retightening of the unidirectional fibers after the operation of applying spot transverse forces. In particular, an effort will be made to obtain the lowest opening factor possible, to avoid damaging the mechanical properties of the part subsequently obtained from such an application of intermediate material. To obtain the lowest opening factor possible, the penetration operation will be implemented by applying to the intermediate material a tension such that the opening created by the penetrating member or means can close up again after the withdrawal of the latter. In particular, a tension of 300 to 2000 g per cm of width will be applied to the intermediate material to obtain such a retightening.

Of course, the member or the means used for the penetration operation is withdrawn either after having traversed the intermediate material in question by making a sole outward journey or a return. This withdrawal will therefore preferably be made before cooling of the thermoplastic and/or thermosetting material, in order to allow the retightening of the fibers. The time to cool the thermoplastic and/or thermosetting material to its setting point will therefore be greater than the time required for the fibers to retighten, or even to completely realign, under the high tension that is applied to them.

The result or goal of this penetration operation is to minimize the risks of delamination, which could occur during the deposition of the intermediate material, in accordance with the deposition step previously described, and particularly during the first centimeters of deposition when it undergoes the main shear forces.

Preferably, the penetration operation is performed in a direction transverse to the surface of the intermediate material that is traversed.

It has been observed that a penetration point density of 40000 to 250000 per $m^2$, and preferably of 90000 to 110000 per $m^2$, would make it possible to obtain particularly satisfactory results in terms of resistance to delamination. The penetration operation can leave or not leave perforations in the intermediate material that has been traversed. The openings created by the penetration operation will usually have a circular or more or less elongated cross-section in the form of an eye or a slot, in the plane of the intermediate material that has been traversed. The resulting perforations are, for example, of a larger size, measured parallel to the surface that has been traversed, reaching up to 10 mm and of a width of up to 300 μm.

Advantageously, the operation of applying spot transverse forces leads to an opening factor greater than or equal to 0 and less than or equal to 5%, and preferably of 0 to 2% and more preferably of 0 to 1%, in such a way as to have as little impact as possible on the mechanical properties of the composite parts subsequently obtained. The opening factor can be defined as the ratio of the surface area unoccupied by the material to the total observed surface area, the observation of which can be achieved from the top of the material with lighting from underneath the latter. It can, for example, be measured using the method described in the patent application WO 2011/086266. The opening factor can be zero and correspond to a material with greatly improved delamination.

Heating will be performed at the penetrating means or around the latter, in such a way as to allow the softening of the thermoplastic and/or thermosetting material initially present only at the surface of the intermediate material, and its penetration into the unidirectional fiber layers. A heating resistor can, for example, be directly integrated into the penetration means, of needle type. The melting of the thermoplastic material, or the partial or complete polymerization in the case of a thermosetting material, thus takes place around the penetrating means, which, after cooling, leads to the creation of bonding bridges between the fibers of the unidirectional layer. Preferably, the heating means is directly integrated into the penetrating means, so that the penetrating means is itself heated.

Figure 7:
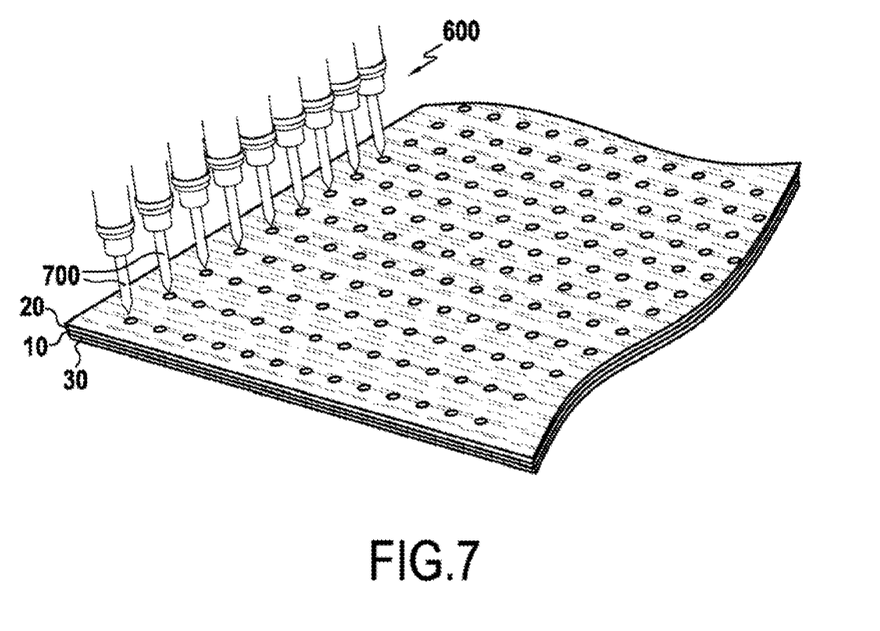
FIG. 7 schematically represents a device for applying spot transverse forces.

During the penetration, the intermediate material will be able to abut a surface that can then be heated locally around the penetrating means, in order to effect localized heating around the latter or else, on the contrary, be totally isolated, in such a way as to avoid a softening of the layer of thermoplastic or thermosetting materials, or of a mixture of the two, with which it will be in contact. FIG. 7 shows a heating/penetration device 600 equipped with an assembly of needles 700 aligned in accordance with the selected penetration lines and spacing increments.

Figure 5:
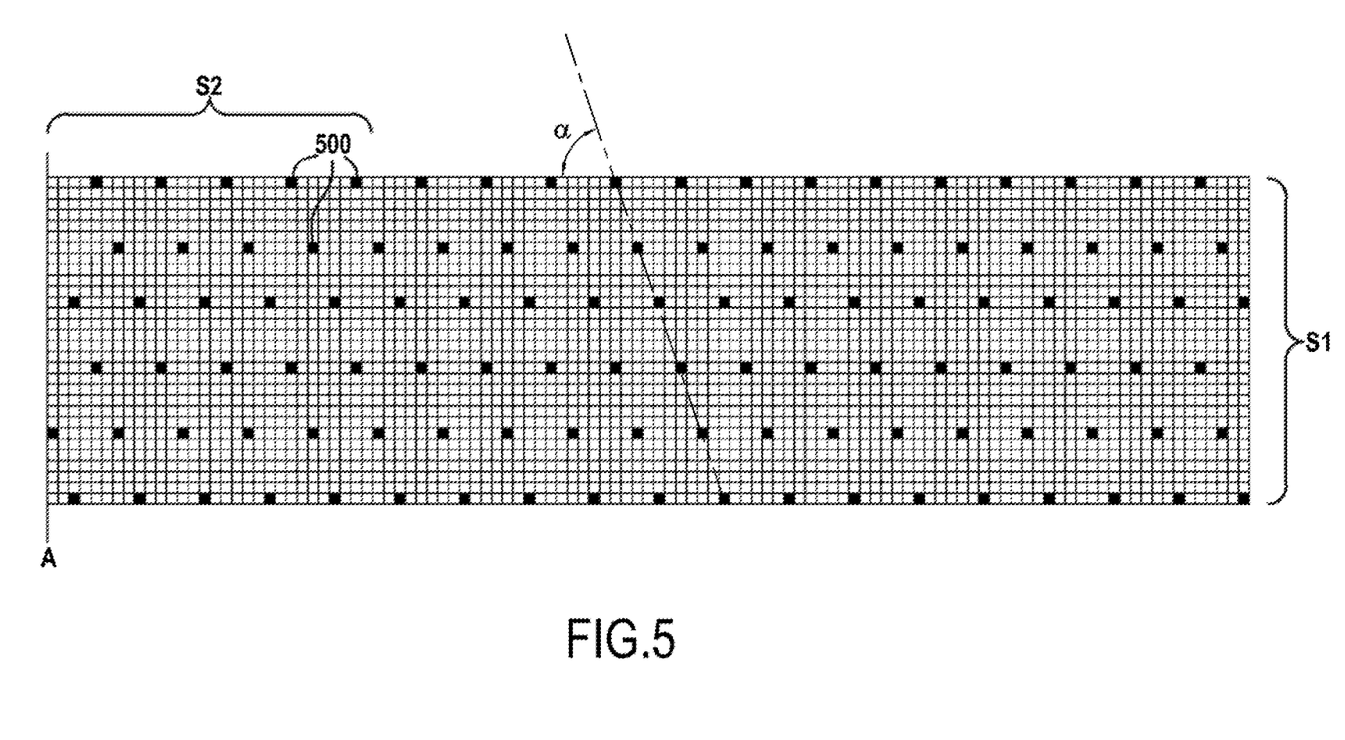
FIG. 5 is a schematic view of a series of application points where transverse forces, penetrations or perforations are exerted.

The penetration points are, preferably, arranged in such a way as to form, for example a network of parallel lines, and will therefore be advantageously arranged in two series S1 and S2 of lines, so that:

In each series S1 and S2, the lines are parallel to each other,

The lines of a series S1 are perpendicular to the direction A of the unidirectional fibers of the sheet, The lines of the two series S1 and S2 are secant and together form an angle α different from 90°, and particularly in the order of 50 to 85° which is of around 60° in the example illustrated in FIG. 5.

Figure 6A:
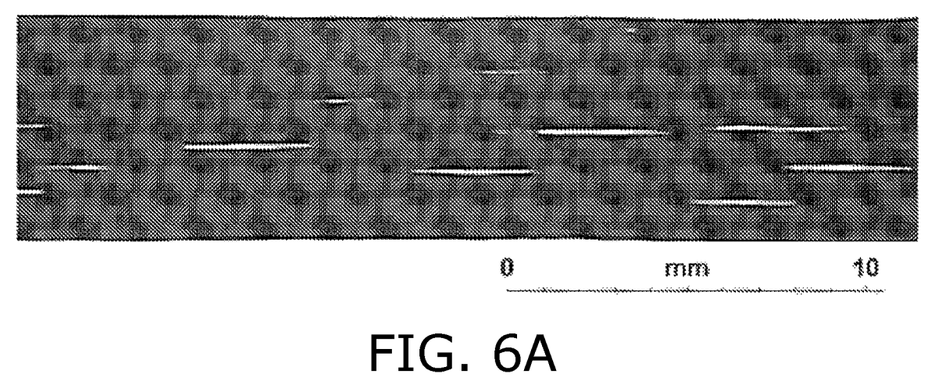
FIG. 6A is an overall photograph of a perforated intermediate material that can be used in the context of the invention.
Figure 6B:
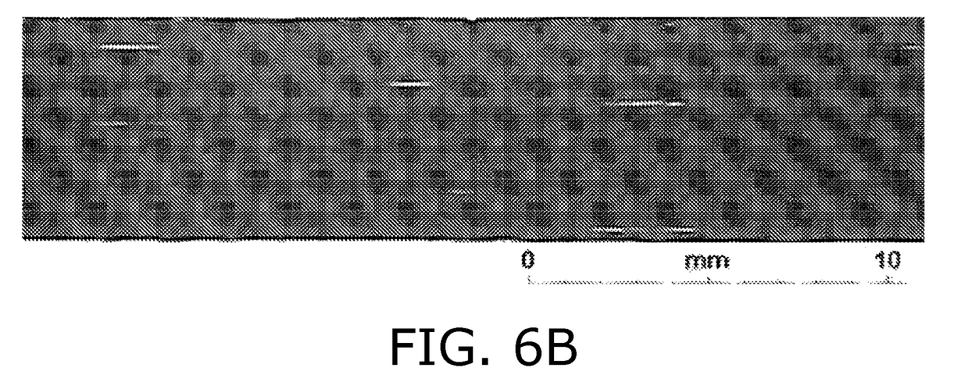
FIG. 6B is a photograph of another perforated intermediate material that can be used in the context of the invention, having different features (OF).

Such a configuration is illustrated in FIG. 5. Given that at the penetration points 500, the penetration of a member such as a needle, can incur, not the formation of a hole, but rather a slot as shown in FIGS. 6A and 6B, due to the fact that the unidirectional fibers spread apart from one another at the penetration point, the slots are thus offset with respect to one another. This avoids the creation of an excessively large opening due to the meeting of two slots that are too close together.

FIG. 6A shows an intermediate material composed of a unidirectional sheet of 140 g/$m^2$ of IMA 12K carbon fibers from the Hexcel Corporation® with a 1R8D03 veil from Protechnic® (Cernay, France) thermocompressed on either face. This intermediate material has a width of 6.35 mm and an opening factor of 1.6% (standard deviation 0.5%). It was produced by penetration with a series of hot needles with a tension of 315 g/cm.

FIG. 6B shows an intermediate material of 210 g/$m^2$ of IMA 12K fibers from Hexcel Corporation® with a 1R8D06 veil from Protechnic® (Cernay, France) thermocompressed on either face, of 6.35 mm in width having an opening factor of 0.5% (standard deviation 0.3%). It was produced by penetration with a series of hot needles with a tension of 315 g/cm.

It appears that the basis weight of the reinforcing threads and the veil have an effect on the opening factor obtained with one and the same tension of the threads during perforation. The 210 g/$m^2$ sheet has a smaller opening factor than the 140 g/$m^2$ sheet, even though a veil of higher grammage was used. The phenomenon of rearrangement of the filaments under tension occurs more easily with a thicker material. The application WO 2010/046609 describes such intermediate materials having undergone a prior penetration/perforation operation, composed of a unidirectional sheet of carbon fibers, associated on each of its faces to a non-woven material of thermoplastic fibers. The reader may refer to this patent application for more details, given that it describes in detail the intermediate materials that can be used in the context of the invention. It should however be stressed that, in this patent application, a penetration or perforation operation was performed to improve the permeability of the stack during the fabrication of the composite part. In the context of the invention, such an operation is used to improve the cohesion of the intermediate materials during their deposition, which employs gradual deposit and a gradual bonding of the intermediate material and forms bonding bridges between the unidirectional fibers. Such an improvement is highlighted in the examples that follow.

In the context of the invention, whatever the variant of implementation, the operation of applying spot transverse forces will be performed by an appropriate penetrating means, preferably automated, and in particular using a series of needles, pins or otherwise. The needle diameter (in the regular part after the tip) will in particular be of 0.8 to 2.4 mm. The application points will usually be spaced apart by 5 to 2 mm.

The penetration operation is performed on the intermediate materials which are then laid up, or even stacked to form a stack required for the production of a composite part. It is not necessary for the penetration points to then be superimposed during the stacking of the intermediate materials. Preferably, the produced stack is exclusively composed of intermediate materials defined in the context of the invention, having undergone the penetration operation.

According to a preferred embodiment in the context of the invention, it is possible to produce the stack by superimposition of intermediate materials composed of a reinforcing material based on unidirectional carbon fibers, associated on at least one of its faces to a layer of thermoplastic or thermosetting material or of a mixture of the two. Such an intermediate material can be composed of a unidirectional sheet of carbon fibers, associated on a single one of its faces, or on each of its faces, to a layer of thermoplastic or thermosetting material or of a mixture of the two. Such intermediate materials have a proper cohesion, the layer(s) of thermoplastic or thermosetting material or of a mixture of the two having been previously associated with the reinforcing material, preferably owing to the thermoplastic or thermosetting nature of the layer by thermocompression.

The stack produced in the context of the invention can comprise a large number of layers of intermediate materials, in general at least four and in certain cases over 100, or even over 200. Each layer of intermediate material(s) can be composed either of a single width of intermediate material, or of side-by-side applications, produced jointly or not with the intermediate materials. The stack will preferably be composed solely of the intermediate materials defined in the context of the invention and according to an advantageous embodiment, of intermediate materials that are all identical.

The reinforcing fibers forming the intermediate materials applied in the context of the invention and, therefore, used for the creation of the stacks are, for example, fiberglass, carbon, aramid, or ceramics, carbon fibers being particularly preferred.

Conventionally, in this field, the term "unidirectional sheet or layer of reinforcing fibers" is understood to mean a sheet composed exclusively or quasi-exclusively of reinforcing fibers applied along one and the same direction, in such a way as to extend substantially parallel to one another. In particular, according to a particular embodiment of the invention, the unidirectional sheet does not include any weft yarn interlacing the reinforcing fibers, or even any sewing that might have the goal of giving cohesion to the unidirectional sheet before its association to a layer of thermoplastic or thermosetting material or of a mixture of the two. This makes it possible, in particular, to avoid any undulations in the unidirectional sheet.

In the unidirectional sheet, the reinforcing yarns are preferably not associated with a polymer binder and are therefore designated as dry, i.e. they are neither impregnated, nor coated, nor associated with any polymer binder before their association to the layers of thermoplastic and/or thermosetting material. The reinforcing fibers are, however, usually characterized by a standard sizing concentration by weight that can represent at most 2% of their weight. This is particularly suitable for the production of composite parts by resin diffusion, using direct methods well known to those skilled in the art.

The constituting fibers of the unidirectional sheets are preferably continuous. The unidirectional layer or sheet present in the applied intermediate materials can be composed of one or more yarns. A carbon yarn is composed of a set of filaments and generally contains 1000 to 80000 filaments, advantageously 12000 to 24000 filaments. In a particularly preferred manner, in the context of the invention, carbon yarns of 1 to 24K, for example of 3K, 6K, 12K or 24K, and preferably of 12K and 24K are used. For example, the carbon yarns present within the unidirectional sheets have a count of 60 to 3800 tex, and preferably 400 to 900 tex. The unidirectional sheet can be produced with any type of carbon yarn, for example High Resistance (HR) threads, the tensile modulus of which is between 220 and 24 GPa and the stress rupture in tension of which is between 3450 and 4830 MPa, Intermediate Modulus (IM) yarns, the tensile modulus of which is between 290 and 297 GPa and the tensile breaking stress of which is between 3450 and 6200 MPa and High Modulus (HM) yarns, the tensile modulus of which is between 345 and 448 GPa and the stress rupture in tension of which is between 3450 and 5520 MPa (according to the "ASM Handbook", ISBN 0-87170-703-9, ASM International 2001).

In the context of the invention, whatever the variant of implementation of the method for forming a stack, the stack is preferably composed of several intermediate materials each comprising a layer of unidirectional reinforcing fibers, with at least two layers of unidirectional reinforcing fibers extending in different directions. All the layers of unidirectional reinforcing fibers can have different directions, or only some of them can. Otherwise, outside their differences in orientation, the layers of unidirectional reinforcing fibers will preferably have identical features. The favored orientations are usually those forming an angle of 0°, +45° or −45° (also equivalent to +135°), and +90° with the main axis of the part to be produced. The 0° corresponds to the axis of the machine for producing the stack, i.e. the axis that corresponds to the direction of feeding of the stack during its creation. The main axis of the part, which is the largest axis of the part, is generally merged with 0°. It is, for example, possible to produce quasi-isotropic, symmetrical or oriented stacks by choosing the orientation of the plies. Examples of quasi-isotropic stacks include the angles 45°/0°/135°/90°, or 90°/135°/0°/45°. Examples of symmetrical stacks include 0°/90°/0°, or 45°/135°/45°. In particular, stacks comprising more than 4 unidirectional sheets, for example of 10 to 300 unidirectional sheets, can be produced. These sheets can be oriented in 2, 3, 4, 5 or even more different directions.

Advantageously, the intermediate materials used include a unidirectional sheet of carbon fibers having a grammage of 100 to 280 g/m$^2$.

In the context of the invention, whatever the variant of implementation, the layer(s) of thermoplastic and/or thermosetting material present in the intermediate materials used is (are), preferably, a non-woven material made of thermoplastic fibers. Although these possibilities are not preferred, layers of thermoplastic and/or thermosetting material or of a mixture of the two or a fabric, porous film, mesh, knitted fabric or powder deposition could be used. The term "layer of thermoplastic and/or thermosetting material" means that said layer can be composed of a single thermoplastic or thermosetting material, of a mixture of thermoplastic materials, of a mixture of thermosetting materials or of a mixture of thermoplastic and thermosetting materials.

The term "non-woven material", which can also be known as a "veil", is also conventionally understood to refer to an assembly of continuous or short fibers arranged randomly. These non-woven materials or veils can for example be produced by dry methods (drylaid), wet methods (wetlaid), melting methods (spunlaid), for example by extrusion (spunbond), blown extrusion (meltblown), or by spinning with solvent (electrospinning, flashspinning) well known to those skilled in the art. In particular, the fibers forming the non-woven material can have average diameters in the range from 0.5 to 70 µm, and preferably from 0.5 to 20 µm. Non-woven materials can be composed of short fibers or, preferably, of continuous fibers. In the case of a non-woven material of short fibers, the fibers can have, for example, a length between 1 and 100 mm. Non-woven materials offer random and preferably isotropic coverage.

Advantageously, each of the non-woven materials present in the intermediate materials used has a basis weight in the range from 0.2 to 20 g/m². Preferably, each of the non-woven materials present in the intermediate materials used has a thickness of 0.5 to 50 microns, preferably of 3 to 35 microns. The features of these non-woven materials can be determined using the methods described in the application WO 2010/046609.

The layer(s) of thermoplastic or thermosetting material present in the intermediate materials used, and particularly the non-woven materials, is (are) preferably made of a thermoplastic material chosen from among the polyamides, the copolyamides, the ether or ester block polyamides, the polyphthalamides, the polyesters, the copolyesters, the thermoplastic polyurethanes, the polyacetals, the C2-C8 polyolefins, the polyethersulfones, the polysulfones, the polyphenylene sulfones, the polyetheretherKetones, the polyetherKetoneKetones, the phenylene polysulphides, the polyetherimides, the thermoplastic polyimides, the liquid crystal polymers, the phenoxys, the block copolymers such as styrene-butadiene-methylmethacrylate copolymers, the methylmethacrylate-acrylate of butyl-methylmethacrylate copolymers and mixtures thereof.

The other steps used for the manufacture of the composite part are perfectly conventional for those skilled in the art. In particular, the manufacture of the composite part implements, as its final steps, a step of diffusion by infusion or injection of a thermosetting resin, a thermoplastic resin or a mixture of such resins, inside the stack, followed by a step of hardening of the desired part with a step of polymerization/reticulation in a defined pressure-temperature cycle, and a cooling step. According to a particular embodiment, moreover suitable for all the variants of implementations described in relation to the invention, the steps of diffusion, hardening and cooling are implemented in an open mold.

In particular, a resin diffused inside the stack will be a thermoplastic resin as previously listed for the layer of thermoplastic material forming the stack, or preferably a thermosetting resin chosen from among the epoxides, the unsaturated polyesters, the vinyl esters, the phenol resins, the polyimides, the bismaleimides, the phenol-formaldehyde resins, the urea-formaldehydes, the 1,3,5-triazine-2,4,6-triamines, the benzoxazines, the cyanate esters, and mixtures thereof. Such a resin can also comprise one or more setting agents well known to those skilled in the art, to be used with the selected thermosetting polymers.

In the case where the production of the composite part uses the diffusion by infusion or injection of a thermosetting resin, a thermoplastic resin or a mixture of such resins, inside the stack, which is the major application envisioned in the context of the invention, the produced stack, before the addition of this external resin, does not contain more than 10% of thermoplastic or thermosetting material. In particular, the layer(s) of thermoplastic or thermosetting material or of a mixture of the two represent 0.5 to 10% of the total weight of the stack, and preferably 2 to 6% of the total weight of the stack, before the addition of this external resin. Although the invention is particularly suitable for the direct implementation of the method, it is also applicable to indirect methods implementing materials of prepreg type.

Preferably, in the context of the invention, the stack is made in an automated manner.

The invention will preferably use an infusion inside the stack, under reduced pressure, particularly under pressure below atmospheric pressure, particularly of less than 1 bar and preferably between 0.1 and 1 bar, of the thermoplastic or thermosetting resin or a mixture of such resins for the production of the composite part. The infusion will preferably be performed in an open mold, for example by vacuum bag infusion.

The composite part is finally obtained after a thermal processing step. In particular, the composite part is generally obtained by a conventional cycle of hardening of the polymers in question, by carrying out the thermal processing recommended by the suppliers of these polymers, and known to those skilled in the art. This step of hardening of the desired part is performed by polymerization/reticulation according to a defined pressure-temperature cycle, followed by cooling. In the case of thermosetting resin, there is usually a step of gelation of the resin before its hardening. The pressure applied during the processing cycle is low in the case of reduced-pressure infusion and higher in the case of injection into an RTM mold.

Advantageously, the composite part obtained has a fiber volume ratio of 55 to 70%, particularly of 57 to 63%, which leads to satisfactory properties for the field of aeronautics. The volume fiber ratio (FVR) of a composite part is calculated from the measurement of the thickness of a composite part, knowing the basis weight of the unidirectional carbon sheet and the properties of the carbon fiber, from the following equation:

$$FVR\ (\%) = \frac{n_{plies} \times \text{Basis weight } UD_{carbon}}{\rho_{carbon\ fibre} \times e_{board}} \times 10^{-1} \quad (1)$$

Were $e_{board}$ is the thickness of the plate in mm,
$\rho_{carbon\ fiber}$ is the density of the carbon fiber in g/cm³,
the basis weight $UD_{carbon}$ is in g/m².

The examples below illustrate the invention, but are in no way limiting in nature.

Description of Initial Materials:
Copolyamide veil of a thickness of 118 µm and of 6 g/m², commercially available under the reference number 1R8D06 by Protechnic® (Cernay, France)
Copolyamide veil of a thickness of 59 µm and of 3 g/m², commercially available under the reference number 1R8D03 by Protechnic® (Cernay, France),
Unidirectional tape made with IMA 12K and 446 tex yarns from Hexcel®, so as to obtain a basis weight of 140, 210 or 280 g/m².

Preparation of the Intermediate Materials
An intermediate material of a width of 6.35 mm corresponding to a combination of polyamide veil/unidirectional carbon fiber sheet/polyamide veil is produced and thermally bonded in accordance with the method described in pages 27 to 30 of the application WO 2010/046609.

A device as illustrated in FIG. 7 is used to carry out a penetration operation on the material, with an arrangement of the penetration points as shown in FIG. 5. In all the tests performed, the needles were heated to a temperature of 220° C. The needles used are made of treated steel with titanium carbonitride. They have a tip of a length of 5.25 mm which has a diameter that increases up to a diameter of 1.6 mm, to finish with a regular part of constant diameter equal to 1.6 mm over a length of 14 mm.

Performance Tests

Test and Modeling Protocol

Specimens:

The specimens are made from a yarn of a length of 200 mm, laminated to an adhesive tape of 50 mm on its two opposite faces. The stress is exerted by a traction machine by way of the adhesive tapes. A tractive force in a direction parallel to the length of the specimen and of opposite direction is applied to each of the faces of the specimen. The total stressed length is therefore applicable to the whole sample, i.e. 200 mm.

The test is performed at constant speed until total debonding of the specimen, and the value of the highest tensile strength obtained is retrieved.

The following parameters were set for all the tests:
Specimen length: 20 cm
Glued length of the adhesive tapes: 5 cm
Strain rate: 37.5 m/s
In each case, at least five specimens are tested.

1. Study of the Effect of the Tension Applied to the Intermediate Material During Microperforation The effect of the tension applied to the intermediate material during microperforation is studied on the median grammage (210 g/m²). The result obtained can be extrapolated to the whole range of grammages.

To vary the tension applied to the intermediate material, the braking of the reels placed upstream of the microperforation machine is increased.

The tension is controlled using a portable tensiometer of DTBX 500-10 and 5000-20 type upstream of the microperforation machine composed of a needle roller.

Figure 8:
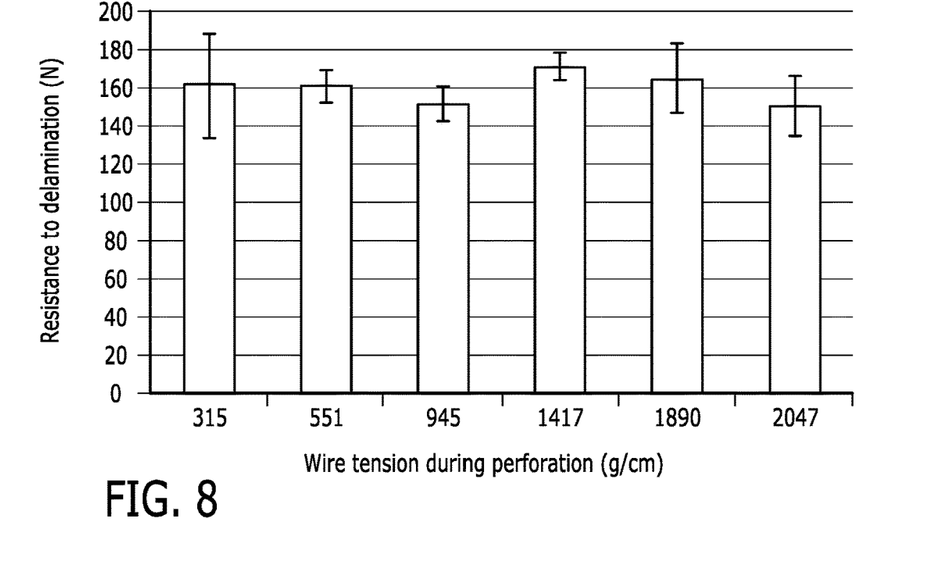
FIG. 8 studies the resistance to delamination of an intermediate material used in the context of the invention, as a function of the tension applied to said intermediate material during a perforation operation.

The results obtained are shown in FIG. 8 and demonstrate that the tension applied to the intermediate material has no effect on the resistance to delamination obtained. On the other hand, the applied tension has an effect on the opening factor as the results shown in TABLE1 demonstrate.

TABLE 1

| OF (%) | Tension (g/cm) |
|---|---|
| 4 | 15 |
| 1 | 315 |
| 0 | 945 |

It is interesting to note that the tension has a linear relationship with the opening factor in the case of a logarithmic tension scale.

The tests shown in points 2 to 4 below were performed with a tension 315 g/cm.

2. Effect of the Perforation Density

To test the effect of the microperforation density, the density was divided by two. The tests were performed for the two grammages 210 and 280 g/m² for one type of veil (1R8D06 of 6 g/m²).

The results obtained with the microperforation density divided by two (MP/2 in FIG. 9) are compared to the performances achieved without (Std in FIG. 9) and with microperforations (full density MP in FIG. 9 which corresponds to 9.2 holes/cm²) for equivalent grammage and veil type.

Figure 9:
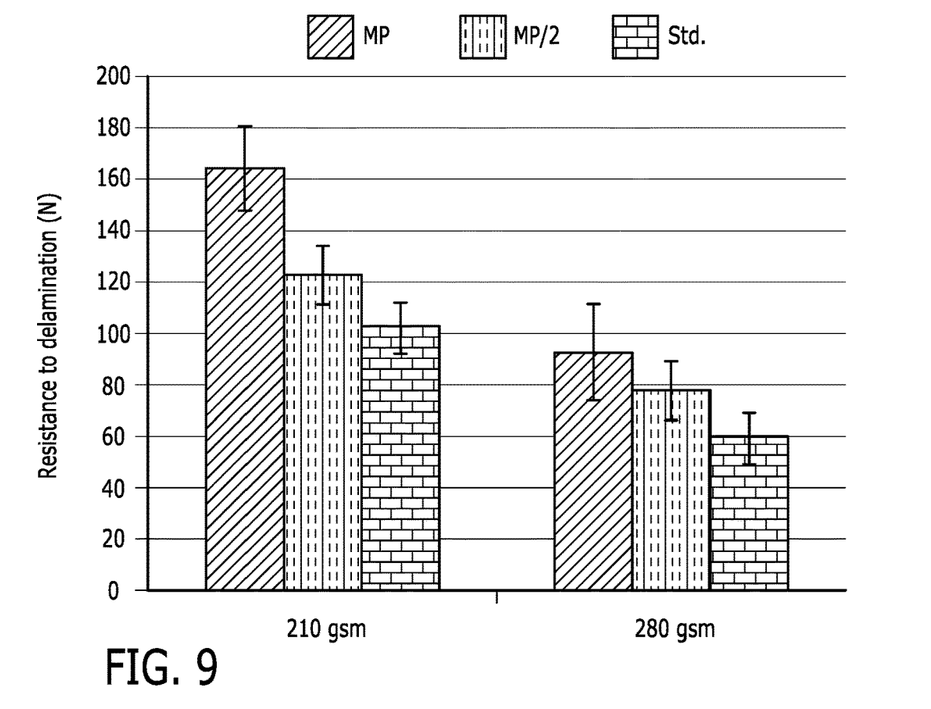
FIG. 9 studies the resistance to delamination obtained as a function of the density of microperforations applied to the intermediate material, in different cases of grammage of the unidirectional sheets of carbon fibers.

The results are shown in FIG. 9 and a clear rise in the resistance to delamination is observed with an increase in the perforation density.

It is therefore clearly apparent that the microperforations improve the resistance to delamination and that this improvement increases with the perforation density.

3. Comparison of the Obtained Performance as a Function of the Grammage of the Unidirectional Sheet and of the Veil.

Figure 10:
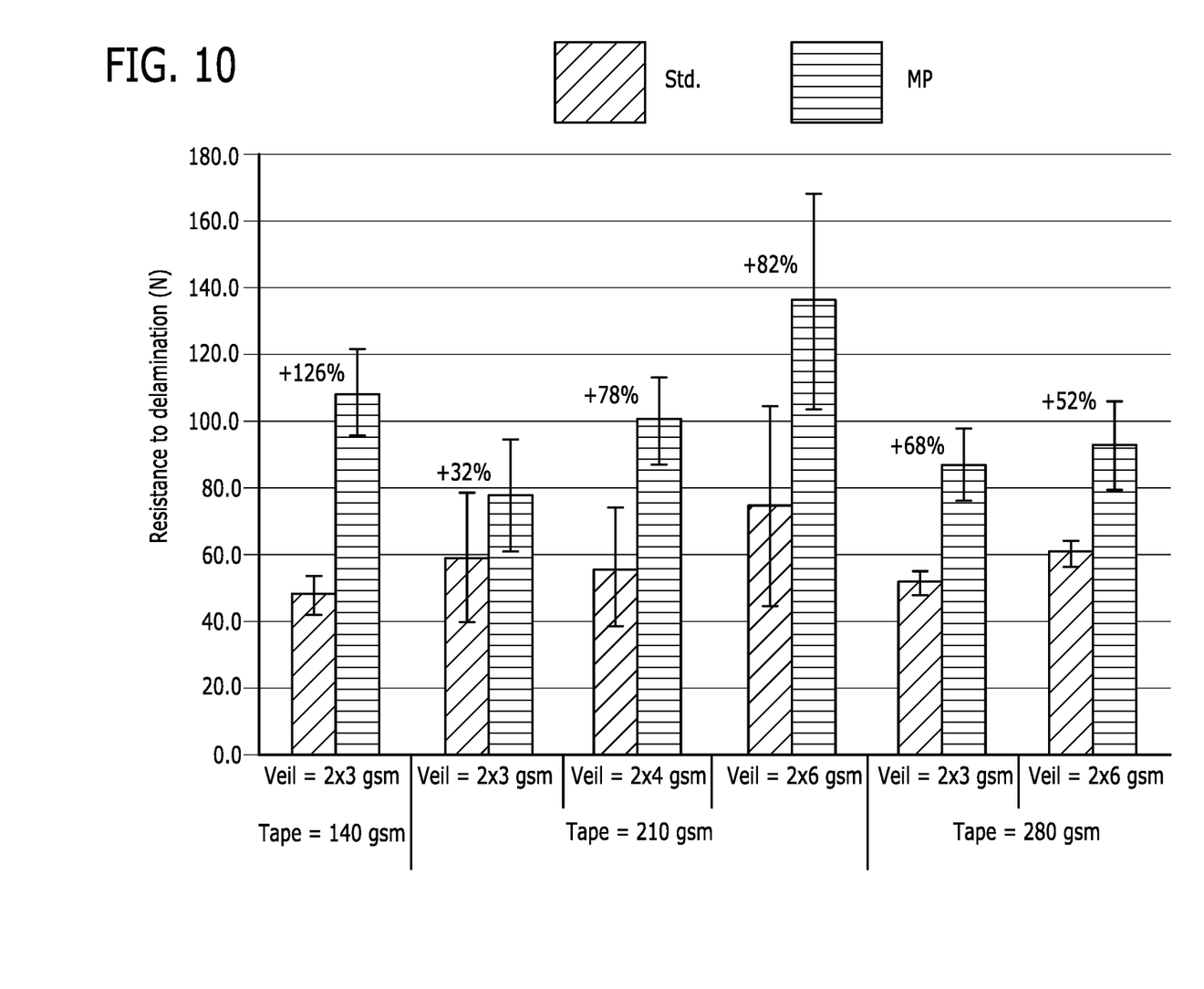
FIG. 10 shows the resistance to delamination results obtained for various intermediate materials as a function of the veil and of the grammage of the unidirectional sheet of carbon fiber used.

The set of resistance to delamination results obtained as a function of the grammage of the unidirectional material and of the veil used are shown in FIG. 10.

It is apparent that whatever the case under examination, the use of a perforated intermediate material (MP) compared to an unperforated intermediate material (Std) makes it possible to considerably improve the results and leads to better resistance to delamination.

4. Effect of the Percentage of Veil.

The proportion of veil is expressed in % by weight, with respect to the weight of carbon fibers present in the intermediate material.

Results obtained by applicant demonstrate that for the same parameters of through stress, the resistance to delamination grows with the increase in the percentage by weight of veil.

5. Effect of the Opening Factor Obtained after the Penetration Operation on the Mechanical Properties of the Stratified Materials.

It has been demonstrated that a stratified material produced by injection of RTM6 epoxy resin (Hexcel Corporation®) into an intermediate material in accordance with Paragraph 1 having undergone a spot application of transverse forces combined with a tension of 15 g/cm and leading to an opening factor of 4% statistically gave a Compression value of 0° according to the EN2850B standard, around 7% lower than the same stratified material produced from an intermediate material having undergone a spot application of transverse forces combined with a tension of 945 g/cm and leading to an opening factor of 0%. The stratified material produced from an intermediate material not having undergone such transverse forces is still slightly better but is not optimized in terms of delamination during automated lay-up. The results are shown in TABLE 2.

TABLE 2

| | Compression 0°-EN2850B (Mpa) | |
|---|---|---|
| IMA 12K-1R8D06 2 faces-194 g/m²-300 mm/RTM6 | Mean | Standard deviation |
| Intermediate material OF 0% non-microperforated | 1665 | 100 |
| Intermediate material OF 0% produced at 945 cN/cm of tension | 1612 | 102 |
| Intermediate material OF 4% produced at 15 cN/cm of tension | 1514 | 93 |

The invention claimed is:

1. A method for making an a delamination resistant intermediate material composed of a fiber layer comprising of unidirectional reinforcing fibers, said fiber layer having at least one thermoplastic layer comprising thermoplastic material located on one or both faces of said fiber layer, said delamination resistant intermediate material being resistant to separation of said at least one thermoplastic layer from said fiber layer during application of said intermediate material to a deposition surface, said method comprising the steps of: providing an intermediate material comprising a fiber layer comprising unidirectional reinforcing fibers wherein said unidirectional reinforcing fibers extend parallel to each other in a fiber direction, said intermediate material comprising at least one thermoplastic layer comprising thermoplastic material located on one or both faces of said fiber layer, wherein said fiber layer has a grammage of 100 to 280 grams per square meter and said at least one thermoplastic layer do not form more than 10% of the total weight of said intermediate material, and performing a penetration operation on said intermediated material to form said delamination resistant intermediate material, said penetration operation comprising the steps of applying a spot transverse force to a plurality of application spots at spaced locations on said intermediate material, while said intermediate material is under a tension of 300 to 2000 grams per centimeter of width in said fiber direction, said applications of spot transverse forces being accompanied by heating to said at least one thermoplastic layer to form melted thermoplastic material which is at a temperature above the setting point of said thermoplastic material and to form an opening transversely through said intermediate material at each of said application spots wherein a bridge of melted thermoplastic material is formed that extends between the faces of said fiber layer around each of said openings, and releasing said application of spot transverse force at said plurality of application spats while maintaining said tension wherein said tension enables said openings to close before said melted thermoplastic material cools below said setting point, and wherein the step of applying spot transverse force is performed to provide a density of application spots of 40000 to 250000 per square meter.

2. The method according to claim 1 wherein the application of spot transverse forces is performed by penetration of a needle or a series of needles.

3. The method according to claim 1 wherein said density of application points is 90000 to 110000 per square meter.

4. The method according to claim 1 wherein the transverse forces are applied at application spots arranged in lines running parallel to one another.

5. The method according to claim 1 wherein said layer of unidirectional reinforcing fibers comprises unidirectional carbon fibers.

6. The method according to claim 1 wherein said at least one thermoplastic layer comprises non-woven thermoplastic fibers.

7. The method according to claim 5 wherein said at least one thermoplastic layer comprises non-woven thermoplastic fibers.

8. The method according to claim 6 wherein said non-woven thermoplastic fibers comprise polyamide fibers and/or copolyamide fibers.

9. The method according to claim 7 wherein said non-woven thermoplastic fibers comprise polyamide fibers and/or copolyamide fibers.

10. The method according to claim 6 wherein said at least one thermoplastic layer has a basis weight in the range from 0.2 to 20 g/m$^2$.

11. The method according to claim 6 wherein said at least one thermoplastic layer has a thickness of 0.5 to 50 microns.

12. The method according to claim 11 wherein said at least one thermoplastic layer has a thickness of 3 to 35 microns.

13. The method of claim 1 wherein said at least one thermoplastic layer has a thickness of 3 to 35 microns.

* * * * *